May 16, 1939.    E. A. WETZEL    2,158,808
SEALING STRIP
Filed April 24, 1937

INVENTOR
Edward A. Wetzel.
BY Dike, Calver & Gray
ATTORNEYS.

Patented May 16, 1939

2,158,808

UNITED STATES PATENT OFFICE 2,158,808

SEALING STRIP

Edward A. Wetzel, Detroit, Mich., assignor to Briggs Manufacturing Company, Detroit, Mich., a corporation of Michigan Application April 24, 1937, Serial No. 138,711

4 Claims. (Cl. 296—44)

This invention relates to sealing strips for doors, such as the doors of vehicle bodies, and particularly to sealing strips useful for effecting a relatively tight closure along the bottoms of doors of motor vehicle bodies.

An object of the invention is to provide inexpensive and effective sealing means for the joint or space between the lower or bottom portion of the vehicle body door and the adjacent vehicle body frame or floor sill.

Another object of the invention is to provide novel sealing means capable of being attached directly to the floor sill.

Another object is to provide compressible or flexible sealing means capable of sealing spaces of varying depths so as to compensate for variations in the fitting of the doors.

A further object of the invention is to provide sealing means of the foregoing character capable of forming a support or seat for the floor covering adjacent the sill of the vehicle floor.

The above and other objects of the invention will appear from the following description and appended claims when considered in connection with the accompanying drawing forming a part of this specification.

Before explaining in detail the present invention it is to be understood that the invention is not .mited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

Figure 1:
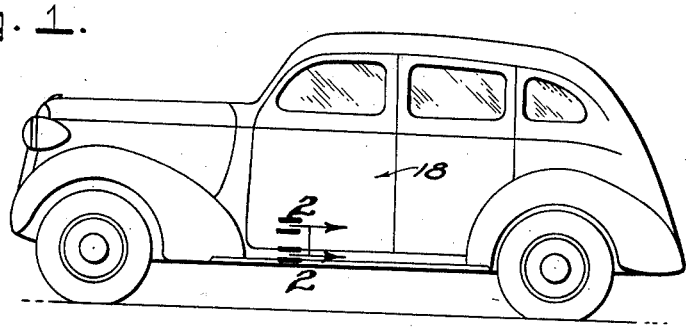
Fig. 1 is a side elevation of an automobile equipped with sealing means in accordance with the invention.
Figures 2, 3:
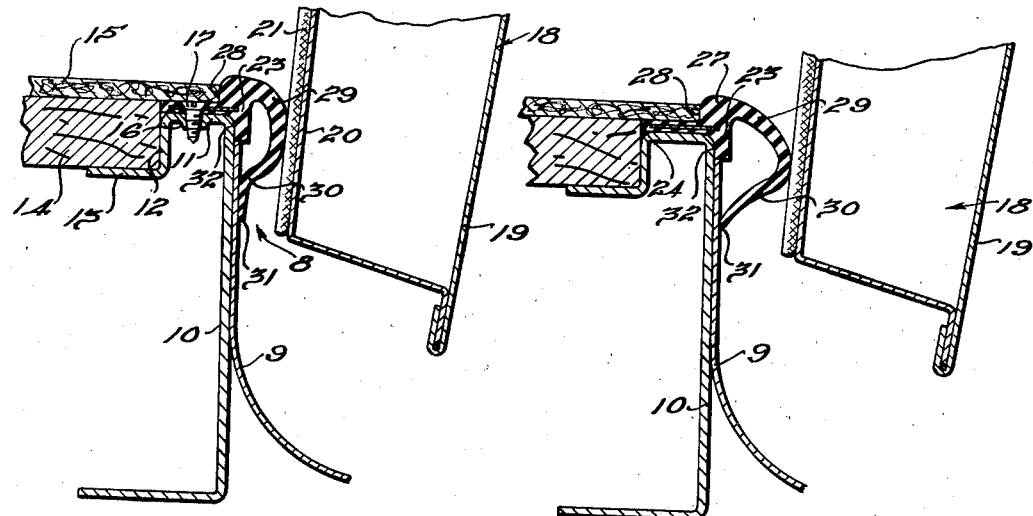
Fig. 2 is a vertical section, on an enlarged scale, taken substantially along the line 2—2 of Fig. 1, looking in the direction of the arrows.
Fig. 3 is a view similar to Fig. 2 but showing the vehicle door at its initial point of contact with the sealing means.
Figures 4, 5:
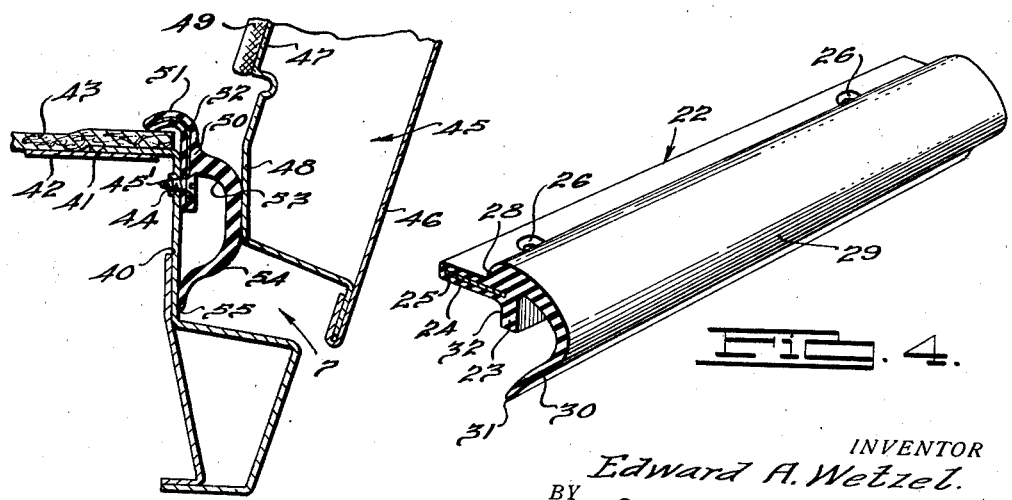
Fig. 4 is a perspective view of the sealing means or strip of Figs. 2 and 3.
Fig. 5 is a view similar to Figs. 2 and 3 showing a somewhat modified form of sealing means embodying the invention.

Referring particularly to Figs. 2, 3 and 4 of the drawing, 10 represents a longitudinal truss member or channel of the vehicle body frame having its upper edge shaped to provide a sill 11 and having a downturned portion 12 and an inwardly directed substantially horizontal flange or portion 13 serving as a seat for the outer edge of the floor 14 to which the usual floor covering 15 has been applied. The web or sill portion 11 is provided at predetermined spaced points with holes 16 for the purpose of receiving screws 17, as hereinafter described.

The vehicle door which cooperates with the channel or sill member 11 is shown as a whole at 18 and comprises an outer panel 19, an inner panel 20 and a trim panel or finish 21 providing the inner face of the door.

It is desirable to seal the space or joint between the bottom edge at the inner face of the door and the sill 11. For this purpose I have provided a sealing strip or member shown as a whole at 22, formed of resilient or flexible material such as rubber and comprising a body portion 23 from the rear or inner face of which a horizontal rubber flange 24 projects. Embedded in said flange or portion 24 is a metal strip or plate 25 provided at predetermined spaced points with holes (not shown) which register with holes 26 formed in the rubber flange. The purpose of the metal strip 25 is two-fold, namely to reenforce the flange and thereby cause it to retain its shape, and also to provide means permitting the quick and easy attachment of the sealing strip to the sill 11.

The upper portion of the body 23 is enlarged or thickened at 27 and its inner face provides a shoulder 28 above the flange 24 for a purpose to be hereinafter described. The sealing strip has a portion 29 which flares outwardly and downwardly and an integral portion 30 which flares inwardly and downwardly and terminates in a lip or edge portion 31. The part 29 is somewhat stiffer than the parts 30 and 31 so that the parts together provide a set convex or bulged portion in normal condition, see Figs. 3 and 4, which is engaged by the inner face of the door and flattened out in the direction of the sill when the door is closed, thus holding the parts under compression, see Fig. 2, and sealing the space 8 between the door and the sill. When the strip 22 is installed in position upon the sill, the portions 30 and 31 are flexed out slightly so as to be held under tension snugly against the sill when the door is in open position.

In practice the flange or horizontal portion 24 is laid upon the sill 11 and secured thereto by the screws 17. The shoulder 32 of the body portion fits snugly over the exposed longitudinal edge of the sill 11 and the shoulder 28 serves as an abutment for the outer edge of the floor covering 15.

Referring now particularly to Fig. 5, there is shown a somewhat modified form of sealing strip embodying the invention. The longitudinal frame member of the body adjacent the door is shown as a whole at 40. This member has a top inturned flange 41 which provides the door sill. In the present instance the floor 42 is formed of metal and is provided with a conventional covering 43. The vertical leg or web of the member 40 is provided at predetermined spaced points with holes 44 to receive screws 45', as hereinafter referred to. The door in the present instance is shown as a whole at 45 and has an outer panel 46, an inner panel 47 having a lower extension 48, and an upholstered finish sheet or trim panel 49. In the present form, the sealing means or strip is preferably formed of elastic or resilient rubber material. It comprises a body portion 50 having an upwardly and inwardly curved flange or portion 51, the body and flange being reenforced by a similarly shaped metal strip or plate 52 which is embedded therein. The body portion 50 of the sealing strip has an outwardly and downwardly flared sealing portion 53 and an integral inwardly and downwardly flared portion or extension 54 terminating in a lip or edge portion 55. The portion 53 is somewhat stiffer than the portions 54 and 55 of the sealing strip to provide a set convex portion, bulge or protuberance which, when engaged by the portion 48 of the door, are flattened and placed under compression, see Fig. 5, with the lip 55 being pressed into intimate engagement with the adjacent portion of the frame member or sill 40 so as to seal the space 7 between the door and the frame member.

The sealing strip of Fig. 5 is attached to the body frame member 40 by means of the screws 45' which pass through holes formed in the body portion of the rubber strip and in the reenforcing metal strip 52, thence passing through the holes 44 formed in the member 40. When thus installed, the portions 54 and 55 are flexed out slightly so as to be held under tension snugly against the sill when the door is in open position. The upper inwardly curved reenforced end 51 of the strip overlies and engages the floor covering 43, thus providing, with the flange 41, a recess or pocket for receiving the edge of said floor covering and maintaining it in smooth condition at the door opening of the body. When the door 45 is in closed position as seen in Fig. 5, ingress of air and moisture into the body of the vehicle is prevented.

From the foregoing it will be seen that when the door is closed the lower inner edge thereof will engage the outwardly bulged portion 29 or 53 of the sealing strip, flattening it inwardly so as to provide a considerable area of contact in a vertical direction for sealing purposes. At the same time the lower lip portion 31 or 55 will be flattened against the face of the frame sill, thereby yieldingly resisting distortion of the bulged portion and enhancing the tight sealing contact thereof. Thus the construction of the strip with its bulged sealing portion and depending lip provides an efficient sealing means for closing the gap at the bottom of the door while also accommodating variations in the width of the gap or space between the door and body sill.

I claim:

1. In a vehicle body having a sill and a door, a compressible sealing strip carried by said sill, said strip having a body portion, a substantially horizontal flange overlying the sill and a depending portion interposed between the sill and door and engaged by the door when in closed position, said depending portion terminating in a lip engaging the vehicle body below the sill, and a metal strip embedded in said flange and providing means for attaching the sealing strip to the sill.

2. In a vehicle body having a sill, a floor, floor covering and a door; a rubber sealing strip having a body portion and a sealing portion interposed between the sill and door and engaged by the door when said door is in closed position, said strip having a horizontal flange secured to said sill and providing with the body portion a seat for the edge of the floor covering.

3. A sealing strip for sealing the space between a vehicle body sill and door, comprising a body portion, a flange projecting from said body at one side thereof and having a metal strip embedded therein for reenforcing the flange, and a flexible sealing portion projecting from the opposite side of the body and adapted to be interposed between the sill and door when the sealing strip is applied to a sill.

4. A rubber sealing strip for sealing the joint between a vehicle body sill and door, comprising a body portion having a substantially horizontal flange for attaching the strip to a sill, and a bulged portion extending from the body portion on the side thereof opposite said flange, said bulged portion being adapted to be positioned between the door and the sill and to be flattened and placed under compression by the door when the door is moved into closed position, said bulged portion terminating in a lip engaging the vehicle body below the sill.

EDWARD A. WETZEL.